(12) United States Patent
Kang et al.

(10) Patent No.: US 8,394,531 B2
(45) Date of Patent: Mar. 12, 2013

(54) NEGATIVE ACTIVE MATERIAL FOR A RECHARGEABLE LITHIUM BATTERY, A METHOD OF PREPARING THE SAME, AND A RECHARGEABLE LITHIUM BATTERY INCLUDING THE SAME

(75) Inventors: Yong-Mook Kang, Yongin-si (KR);
Joon-Sup Kim, Yongin-si (KR);
Sang-Min Lee, Yongin-si (KR);
Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 973 days.

(21) Appl. No.: 11/592,630

(22) Filed: Nov. 2, 2006

(65) Prior Publication Data

US 2007/0099086 A1    May 3, 2007

(30) Foreign Application Priority Data

Nov. 2, 2005    (KR) .................. 10-2005-0104200

(51) Int. Cl.
*H01M 4/13* (2010.01)
*H01M 4/1395* (2010.01)

(52) U.S. Cl. ................................. 429/218.1

(58) Field of Classification Search ......... 429/122–347, 429/218.1
See application file for complete search history.

(56) References Cited

U.S. PATENT DOCUMENTS

| | | | |
|---|---|---|---|
| 6,063,142 A * | 5/2000 | Kawakami et al. | 29/623.5 |
| 2003/0054250 A1 * | 3/2003 | Kweon et al. | 429/231.1 |
| 2003/0157407 A1 * | 8/2003 | Kosuzu et al. | 429/231.95 |
| 2004/0185341 A1 * | 9/2004 | Yamamoto et al. | 429/209 |
| 2006/0147797 A1 * | 7/2006 | Wu et al. | 429/218.1 |

FOREIGN PATENT DOCUMENTS

| | | |
|---|---|---|
| JP | 10-83817 | 3/1998 |
| JP | 11-297311 | 10/1999 |
| JP | 2000-90922 | 3/2000 |
| JP | 2004335335 A * | 11/2004 |
| JP | 2004-349056 | 12/2004 |
| KR | 2000-0056301 | 9/2000 |
| KR | 10-2005-0014189 | 2/2005 |

OTHER PUBLICATIONS

Machine translation of JP 2004-335335 originally published Nov. 25, 2004 to Cho et al.*
Machine Translation of JP 2000-090922 to Yamamoto et al. originally published on Mar. 31, 2000.*
Kotz et al., The Chemical World Concepts and Applications, 1994, Harcourt Brace & Company, pp. 401-402.*
Patent Abstracts of Japan for Publication No. 11-297311 published on Oct. 29, 1999 in the name of Kusakabe Tetsuya.
Korean Patent Abstracts for Publication No. 1020050014189 A published on Feb. 7, 2005 in the name of Yong Kook Choi, et al.
Patent Abstracts of Japan, Publication No. 10-083817; Date of Publication: Mar. 31, 1998; in the name of Shinichiro Yamada et al.
Patent Abstracts of Japan, Publication No. 2000-090922; Date of Publication: Mar. 31, 2000; in the name of Koji Yamamoto et al.
Patent Abstracts of Japan, Publication No. 2004-349056; Date of Publication: Dec. 9, 2004; in the name of Tatsuo Umeno et al.
Korean Patent Abstracts, Publication No. 1020000056301 A; Date of Publication: Sep. 15, 2000; in the name of Jeong Sun Shin.

* cited by examiner

*Primary Examiner* — Basia Ridley
*Assistant Examiner* — Jonathan G Leong
(74) *Attorney, Agent, or Firm* — Christie, Parker & Hale, LLP

(57) ABSTRACT

A negative active material for a lithium rechargeable battery is provided. The negative active material includes an active metal core and a crack inhibiting layer disposed on a surface of the active metal core. The crack inhibiting layer includes a metal oxide.

11 Claims, 8 Drawing Sheets

FIG. 1

FIG. 2 discharge charge

NEGATIVE ACTIVE MATERIAL FOR A RECHARGEABLE LITHIUM BATTERY, A METHOD OF PREPARING THE SAME, AND A RECHARGEABLE LITHIUM BATTERY INCLUDING THE SAME

CROSS-REFERENCE TO RELATED APPLICATION

This application claims priority to and the benefit of Korean Patent Application No. 10-2005-0104200 filed in the Korean Intellectual Property Office on Nov. 2, 2005, the entire content of which is incorporated herein by reference.

BACKGROUND OF THE INVENTION

1. Field of the Invention

The present invention relates to a negative active material for a rechargeable lithium battery, a method of preparing the same, and a rechargeable lithium battery including the same. More particularly, the present invention relates to a negative active material capable of improving the cycle-life characteristics and initial efficiency of high-capacity rechargeable lithium batteries.

2. Description of the Related Art

The use of portable electronic instruments is increasing as electronic equipment gets smaller and lighter due to developments in high-tech electronic industries. Therefore, studies of high-capacity negative active materials are actively being pursued in accordance with an increased need for batteries having high energy density for use as power sources in these portable electronic instruments. Even though graphite is suggested for the negative active material as it has a theoretical capacity of 372 mAh/g, a novel material having a higher capacity than that of graphite is still needed.

Elemental materials such as Si, Sn, and Al have been developed as substitutes for graphite. These elemental materials are known to alloy with lithium and have higher electric capacities than graphite.

However, elements themselves have not yet been commercialized as negative active materials because the elements (such as Si, Sn, Al, and so on) form alloys with lithium during charge-discharge and undergo volume expansion and shrinkage resulting in element pulverization. As a result, the cycle-life of the battery may decrease.

Recently, certain materials have been proposed as substitutes for the conventional graphite material. One such substitute includes a simple mixture of a graphite and silicon compound powder. Another proposed substitute includes a material in which a pulverized silicon compound is chemically fixed on the surface of graphite by a silane coupling agent. A third substitute includes a material in which a metal such as Si is bound with or coated on a graphite-based carbonaceous material.

However, in the simple mixture of a graphite and silicon compound powder, the graphite does not completely contact the silicon compound. As a result, the silicon compound is released from the graphite when the graphite is expanded or contracted upon repeated charge and discharge cycles. Thereby, as the silicon compound has low electro-conductivity, the silicon compound is insufficiently utilized for negative active materials and the cycle characteristics of the rechargeable lithium battery are deteriorated.

In addition, the material in which the pulverized silicon compound is chemically fixed on the surface of graphite by a silane coupling agent works as a negative active material (similar to graphite) at the early charge and discharge cycles. However, the silicon compound expands when it is alloyed with the lithium upon repeated charge and discharge cycles. Thereby, the linkage of the silane coupling agent is broken to release the silicon compound from the graphite such that the silicon compound is insufficiently utilized as a negative active material. As a result, the cycle characteristics of the rechargeable lithium battery are deteriorated. Further, the silane coupling agent may not be uniformly treated upon preparing the negative electrode material so that it is difficult to provide a negative electrode material having consistent quality.

Further, the material in which a metal such as Si is bound with or coated on the graphite-based carbonaceous material has the same problems. That is, upon repeated charge and discharge cycles, the linkage of the amorphous carbonaceous material is broken upon expanding the metal alloyed with the lithium. Thereby, the metal is separated and thus is not sufficiently utilized as a negative active material. As a result, cycle-life characteristics of the lithium rechargeable battery are deteriorated.

SUMMARY OF THE INVENTION

One embodiment of the present invention provides a negative active material for a rechargeable lithium battery having improved cycle-life characteristics and initial efficiency.

Another embodiment of the present invention provides a method of preparing the negative active material for a rechargeable lithium battery.

Yet another embodiment of the present invention provides a rechargeable lithium battery including the above negative active material.

According to one embodiment of the present invention, a negative active material for a rechargeable lithium battery includes an active metal core and a crack inhibiting layer including a metal oxide disposed on a surface of the core.

Nonlimiting examples of suitable active metals include Si, Sn, Al, Zn, Pb, Bi, Ag, Cd, Sb, and combinations thereof. The active metal particles have an average particle diameter of less than or equal to about 50 μm. In one embodiment, for example, the active metal particles have an average particle diameter ranging from about 1 to about 10 μm.

In one embodiment, the metal oxide is a transition element oxide. Nonlimiting examples of suitable transition element oxides include cobalt oxide, nickel oxide, manganese oxide, copper oxide, vanadium oxide, and combinations thereof.

According to one embodiment, the ratio of the thickness of the crack inhibiting layer to the average particle diameter of the active metal particles ranges from about 0.01 to about 1. In one embodiment for example, the ratio ranges from about 0.01 to about 0.5.

In another embodiment, the crack inhibiting layer may further include metal particles that are transition element particles. Nonlimiting examples of suitable transition element particles include particles of Co, Ni, Mn, Cu, V, Al, Ti, and combinations thereof.

According to another embodiment of the present invention, a method of preparing the negative active material for a rechargeable lithium battery includes: a) providing a precursor solution including a metal oxide precursor, b) providing a mixed solution by mixing an active metal powder with the precursor solution, c) drying the mixed solution, and d) heat treating the mixed solution.

According to yet another embodiment of the present invention, a rechargeable lithium battery includes a negative electrode including the above negative active material, a positive electrode including a positive active material capable of reversibly intercalating and deintercalating lithium, and an electrolyte.

BRIEF DESCRIPTION OF THE DRAWINGS

The above and other features and advantages of the present invention will be better understood by reference to the following detailed description when considered in conjunction with the attached drawings in which.

DETAILED DESCRIPTION OF THE INVENTION

An exemplary embodiment of the present invention will now be described with reference to the accompanying drawings.

When a metal-based active material is used as a negative active material for a rechargeable lithium battery, lithium ions move to the negative electrode during charging and are alloyed with the metal-based active material, thereby expanding the volume. However, lithium ions move to the positive electrode during discharging, thereby contracting the volume. When these processes are repeated, the metal-based active material pulverizes, i.e., it starts to crack, and then finally breaks into minute particles. In addition, the active material separates from the current collector or the conductive material in the negative electrode, thereby becoming electrically insulated therefrom. Therefore, as a rechargeable battery is repeatedly charged and discharged, the electric conductivity of the negative electrode gradually weakens, resulting in decreased battery efficiency.

According to one embodiment of the present invention, the negative active material includes an active metal core and a crack inhibiting layer including a metal oxide disposed on a surface of the core.

The active metal may be any metal that can be alloyed with lithium during an electrochemical reaction within the cell. Nonlimiting examples of suitable active metals include Si, Sn, Al, Zn, Pb, Bi, Ag, Cd, Sb, and combinations thereof. In one embodiment, the active metal is selected from Si and Sn, which have large capacities.

The crack inhibiting layer surrounds each active metal particle, and thereby suppresses volume expansion by alloying the active metal particles with lithium during charging. The crack inhibiting layer reduces volume changes in the active metal particles during charge and discharge and suppresses cracks in the active metal particles. In addition, since it suppresses volume expansion of the active metal particles, volume expansion of the negative active material including the active metal particles can also be suppressed, thereby preventing detachment from the conductive material and the current collector. In summary, the crack inhibiting layer prevents active metal particles from cracking and prevents the negative active material including the active metal particles from detaching from the conductive material and the current collector, thereby maintaining the electrical conductivity of the negative electrode during repeated charging and discharging.

According to one embodiment of the present invention, the crack inhibiting layer includes a film-like membrane structure in which a metal oxide is densely formed. Alternatively, the crack inhibiting layer may include a particle structure in which the metal oxide is loosely formed as a fine lump on the surface of the active metal.

Nonlimiting examples of suitable metal oxides for use in the crack inhibiting layer include transition element oxides such as cobalt oxide, nickel oxide, manganese oxide, copper oxide, vanadium oxide, and combinations thereof. The crack inhibiting layer may further include metal particles which are not oxidized but that exist as a metal when a metal oxide is formed on the surface of the active particles. The metal particles improve the electrical conductivity of the negative active material.

The active metal particles may have an average particle diameter of less than or equal to about 50 μm. In embodiment, for example, the active metal particles have an average particle diameter ranging from about 1 to about 10 μm. When the active metal particles have an average particle diameter of more than about 50 μm, the total surface area of the active metal particles decreases, resulting in a reduction in negative active material reactivity.

The ratio of the thickness of the crack inhibiting layer to the average particle diameter of the active metal particles may range from about 0.01 to about 1. In one embodiment, for example, the ratio ranges from about 0.01 to about 0.5. When the ratio is more than about 1, it is difficult to alloy the lithium ions with the active metal. When the ratio is less than about 0.01, suppression of the volume expansion may be negligible.

In one embodiment, the crack inhibiting layer has an ion conductivity of greater than or equal to about 0.012 1/mohm·cm.

Figure 1:
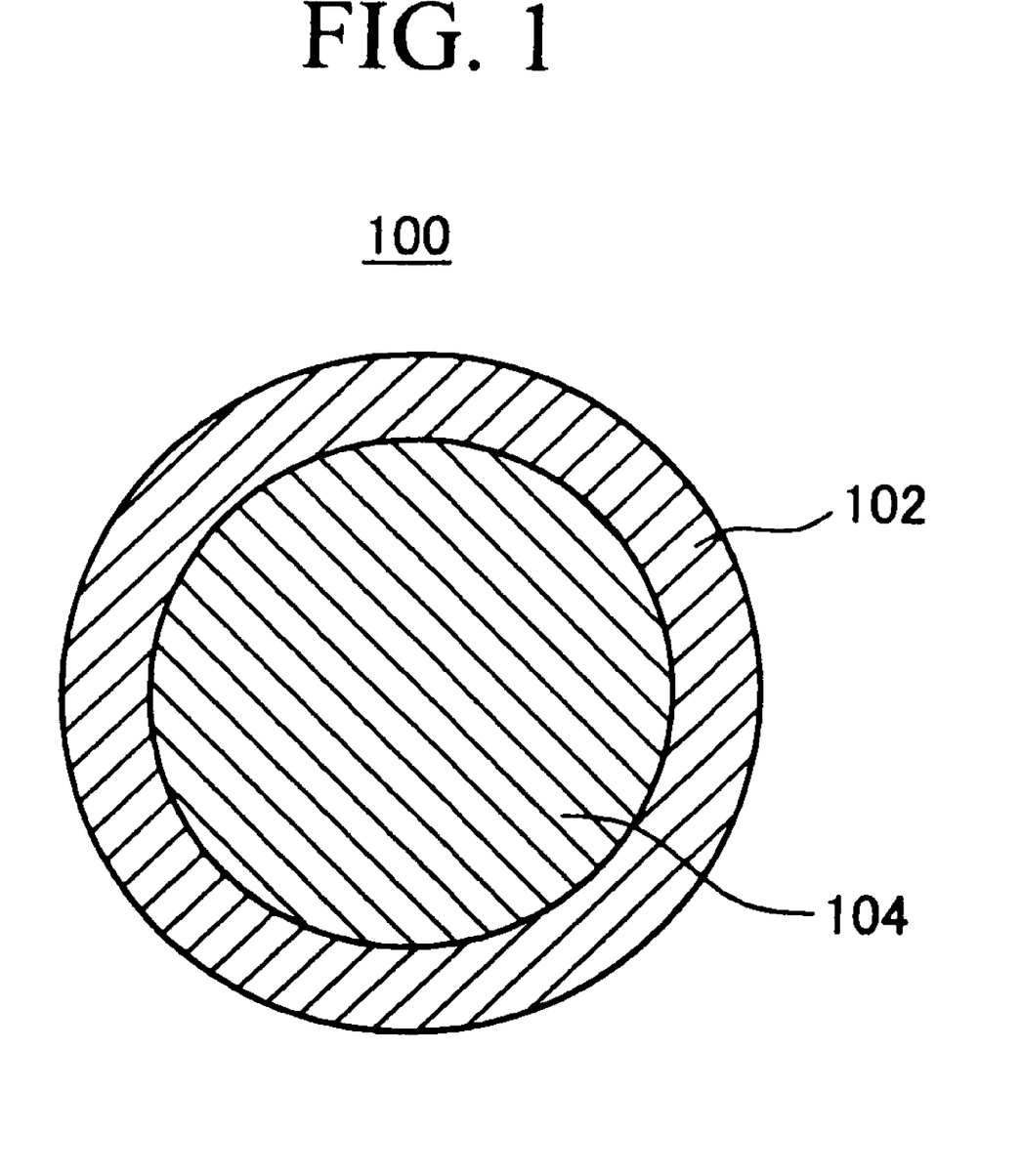
FIG. 1 is a cross-sectional view of a negative active material according to one embodiment of the present invention.

FIG. 1 is a cross-sectional view of a negative active material 100 according to one embodiment of the present invention. As shown in FIG. 1, a negative active material of the present invention comprises a core 104 including an active metal, and a crack inhibiting layer 102 including a carbon-based material, the crack inhibiting layer surrounding the core 104. The crack inhibiting layer 102 suppresses volume expansion of the active metal during charging, and thereby prevents cracking.

A portion of the metal oxides included in the crack inhibiting layer react with lithium ions during charging. As a result, a phase separation between lithium oxide ($Li_2O$) and metal particles may occur in the negative active material with the above structure. Alternatively, the phase separation may not occur.

The phase separation forms pores inside the crack inhibiting layer. Since the phase separation is a non-reversible reaction, the lithium oxides and metal particles are not changed into lithium ions and metal oxides even during discharging.

On the other hand, the rest of the metal oxides (i.e. those that remain unreacted with the lithium oxide) surround the outside of the active metal particles, thereby preventing volume expansion of the active metal particles when the active metal particles are alloyed with lithium ions during charging. As a result, the volume change of the active metal particles during repeated charging and discharging is reduced, thereby suppressing cracking and pulverization and preventing the negative active material from becoming detached from the conductive material and the current collector.

In addition, both the metal particles produced from the reaction of metal oxides with lithium ions and the metal particles produced during the formation of metal oxides are uniformly distributed in the crack inhibiting layer, thereby improving the electric conductivity of the negative active material and significantly reducing non-uniform reactions during charging and discharging.

Furthermore, the reaction forms pores in the crack inhibiting layer, and the pores are compressed by the active metal when the active metal expands. Accordingly, even if the active metal expands, it may have little influence on the negative active material. In other words, the negative active material may not expand much in volume. As a result, detachment of the negative active material from the conductive material and the current collector can be prevented.

Figure 2:
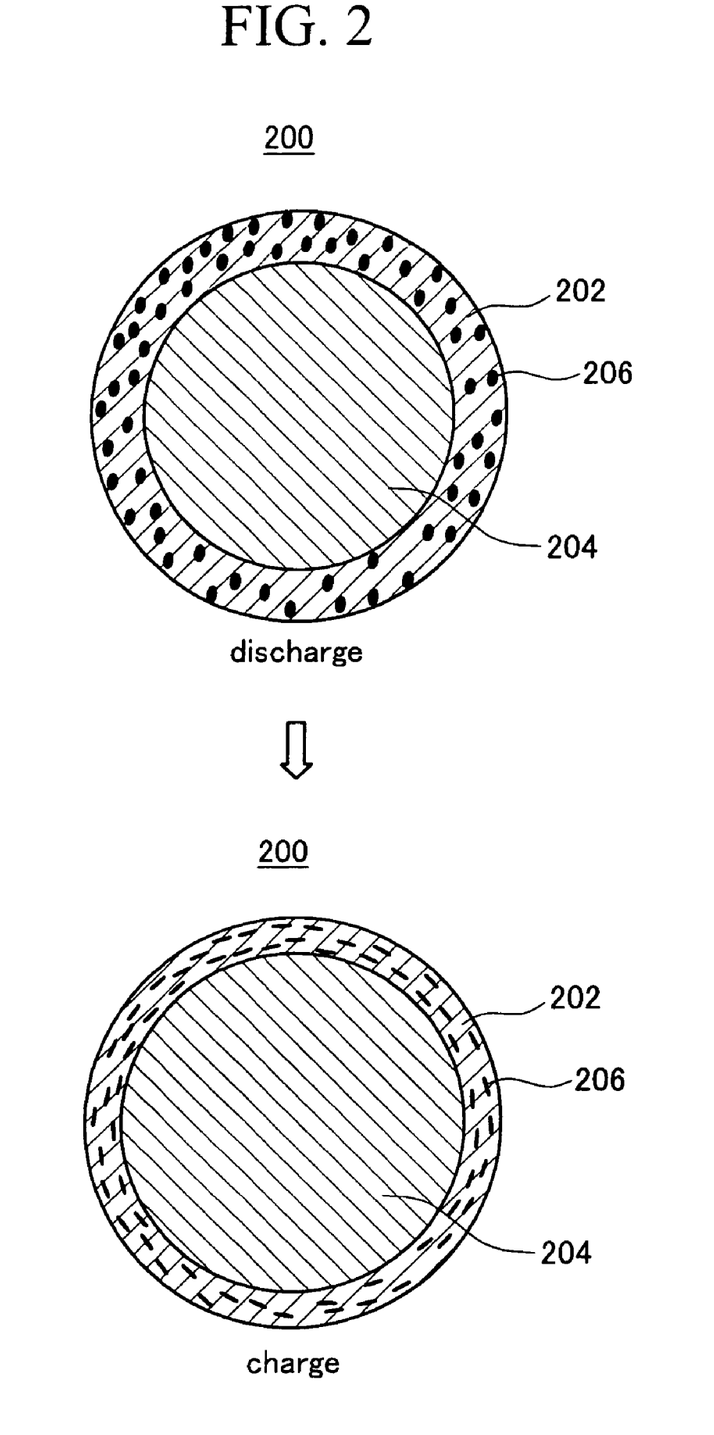
FIG. 2 is a schematic depicting cross-sectional views of a negative active material according to one embodiment of the invention showing changes in the active material when moving from a discharged state to a charged state.

FIG. 2 is a schematic view of the discharge state (top) and the charge state (bottom) of a negative active material 200 including pores 206 inside a crack inhibiting layer 202 according to one embodiment of the present invention. Referring to FIG. 2, even though the active metal 204 expands, it compresses the pores 206 inside the crack inhibiting layer 202, contracting the volume of the pores 206 but not significantly changing the volume of the negative active material 200. Accordingly, detachment of the negative active material from the conductive material and the current collector inside the negative electrode can be prevented.

According to one embodiment of the present invention, a method of preparing a negative active material for a rechargeable lithium battery is provided. First, an acid and a metal oxide precursor are added to a solvent such as water, ethanol, hexane, or the like to prepare a metal oxide precursor solution. Nonlimiting examples of suitable acids include maleic acid, acetic acid, oxalic acid, citric acid, and the like.

Nonlimiting examples of suitable metal oxide precursors include metal-containing acetates, metal-containing hydroxides, metal alkoxides, metal salts, metal-containing nitrates, metal-containing hexahydrates, and combinations thereof. Nonlimiting examples of suitable metal-containing acetates include Co acetate, Ni acetate, Cu acetate, and so on. Nonlimiting examples of suitable metal-containing hydroxides include Co hydroxide, Ni hydroxide, Cu hydroxide, and so on. Nonlimiting examples of suitable metal-containing nitrates include Co nitrate, Ni nitrate, Cu nitrate, and so on. Nonlimiting examples of suitable metal-containing hexahydrates include Co hexahydrate, Ni hexahydrate, Cu hexahydrate, and so on.

Next, an active metal power is added to the precursor solution and mixed therewith. The active metal powder may have an average particle diameter of less than or equal to about 50 µm. In one embodiment, for example, the active metal powder has an average particle diameter ranging from about 1 to about 10 µm.

The active metal in the active metal powder is not particularly limited as long as it alloys with lithium and participates in the electrochemical reactions in the battery. Nonlimiting examples of suitable active metals include Si, Sn, Al, Zn, Pb, Bi, Ag, Cd, and Sb. In one embodiment, for example, the active metal is selected form Si and Sn, which are known to have high capacities.

After mixing the precursor solution with the active metal powder, the mixture is dried and heat-treated. The drying process may be performed at a temperature ranging from about 60° C. to about 200° C. In one embodiment, for example, the mixture is dried at a temperature ranging from about 60° C. to about 100° C. In addition, the heat treatment may be performed at a temperature ranging from about 400° C. to about 1000° C. In one embodiment, for example, the mixture is heat-treated at a temperature ranging from about 700° C. to about 900° C. The precursor of the coating metal is converted into a metal oxide during the heat treatment, and thereafter exists as either a membrane or particle on the surface of the active metal.

A base may be added to the mixture before drying to control the pH. The acidity of the mixture may range from about 2 to about 10. In one embodiment, for example, the acidity of the mixture ranges from about 5.0 to about 8.0. One nonlimiting example of a suitable base includes ammonium hydroxide ($NH_4OH$).

According to another embodiment of the present invention, a lithium rechargeable battery includes a negative electrode including the above negative active material, a positive electrode including a positive active material capable of reversibly intercalating and deintercalating lithium, and an electrolyte.

According to this embodiment of the present invention, the negative active material comprises a core, which includes active metal particles, and a crack inhibiting layer formed on the surface of the core and including a metal oxide. When the rechargeable lithium battery is charged, the metal oxide reacts with lithium ions, causing a phase separation into lithium oxide ($Li_2O$) and metal particles. In addition, when pores are formed inside the crack inhibiting layer, the lithium oxide ($Li_2O$), an unreacted metal oxide, and the pores suppress volume expansion of the negative active material. The metal particles improve the electric conductivity of the negative active material. On the other hand, when the phase separation does not occur, the metal oxide inside the crack inhibiting layer suppresses volume expansion of the negative active material, and the elemental metals maintain the conductivity of the active metal.

The negative active material is mixed with a binder and then applied on a current collector such as copper to form a negative electrode active mass, thereby fabricating a negative electrode. As needed, the active mass may include conductive materials.

Nonlimiting examples of suitable conductive materials include nickel powders, cobalt oxide, titanium oxide, carbon, and so on. Nonlimiting examples of suitable carbonaceous materials for use as the conductive material include ketjen black, acetylene black, furnace black, graphite, carbon fiber, fullerene, and so on. The graphite acts as an electrode structure supporter as well as a conductive material.

Nonlimiting examples of suitable binders include polyvinylidene fluoride, polyvinyl chloride, polyimide, and so on.

Figure 3:
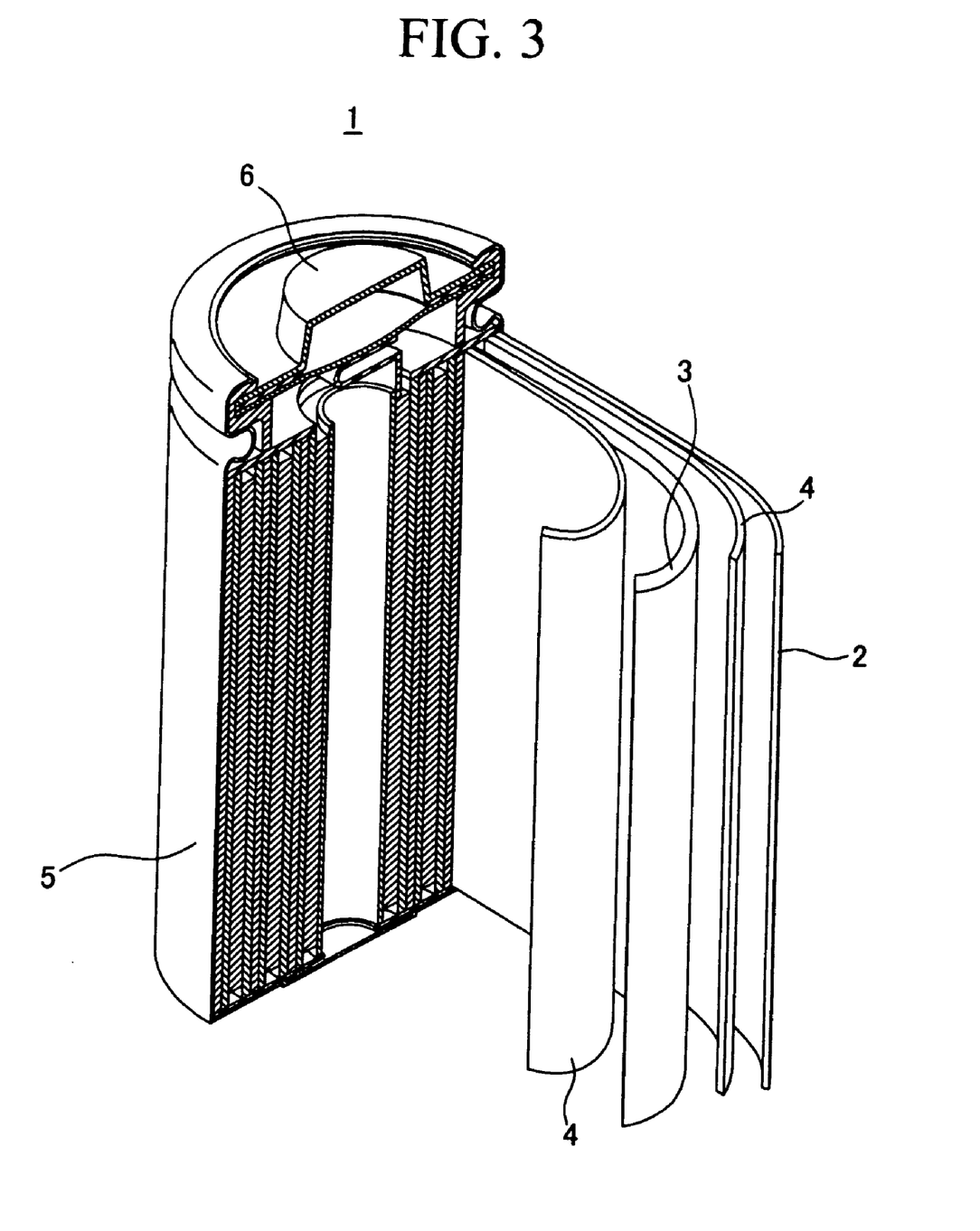
FIG. 3 is a schematic perspective view of a rechargeable lithium battery according to one embodiment of the present invention.

FIG. 3 is a schematic perspective view of a rechargeable lithium battery 1 according to one embodiment of the present invention. The rechargeable lithium battery 1 comprises a negative electrode 2, a positive electrode 3, a separator 4 positioned between the positive electrode 3 and the negative electrode 2, and an electrolyte in which the separator 4 is immersed. In addition, the battery 1 includes a cell housing 5 and a sealing member 6 for sealing the cell housing 5. Even though the rechargeable lithium battery shown in FIG. 3 is cylindrical in shape, the battery may take any suitable shape, such as a prism, a coin, or a sheet.

The positive electrode includes a positive active material, a conductive agent, and a binder. The positive active material may include a compound capable of reversibly intercalating/deintercalating lithium ions, such as $LiMn_2O_4$, $LiCoO_2$, $LiNiO_2$, $LiFeO_2$, $V_2O_5$, TiS, MoS, and so on. The separator may include an olefin-based porous film such as polyethylene, polypropylene, and so on.

The electrolyte may include a lithium salt dissolved in a solvent. The non-aqueous organic solvent acts as a medium for transmitting ions taking part in the electrochemical reaction of the battery. The non-aqueous organic solvent may include, but is not limited to, benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a C2 to C50 linear, branched, or cyclic hydrocarbon, a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, and mevalolactone. A single non-aqueous organic solvent may be used or a mixture of solvents may be used. When a mixture of organic solvents is used, the mixture ratio can be controlled according to the desired battery performance.

The lithium salt is dissolved in the non-aqueous organic solvent to supply lithium ions in the battery. The lithium salt facilitates basic operation of the rechargeable lithium battery, and facilitates the transmission of lithium ions between positive and negative electrodes. Non-limiting examples of suitable lithium salts include supporting electrolytic salts such as $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, and LiI.

Further, instead of the above-mentioned electrolyte, a solid polymer electrolyte may be used. In this embodiment, a polymer having lithium ion-conductivity may be used. Nonlimiting examples of suitable polymers include polyethylene oxide, polypropylene oxide, polyethyleneimine, and so on. The polymer is used in a gel state such that the solvent and the solute are added to the polymer.

The following examples illustrate the exemplary embodiments of the present invention. However, these examples are presented for illustrative purposes only and do not limit the scope of the present invention.

Example 1

11.0785 g of maleic acid and 15.3222 g of cobalt acetate $(Co(CH_3COO)_2)$ were added to 600 ml of distilled water to prepare a precursor solution. Then, 15 g of Si powder having an average particle diameter of less than 44 μm was added to the precursor solution, and $NH_4OH$ was added thereto to regulate the pH to 6.5. The resulting mixture was stirred at 80° C. for 30 minutes. The mixture was dried at 130° C. for 24 hours under a vacuum atmosphere, and then heat-treated at 800° C. for 12 hours under a nitrogen atmosphere, thereby preparing a Si negative active material coated with Co and $CO_3O_4$.

In addition, polyvinylidene fluoride was dissolved in N-methylpyrrolidone as a solvent to prepare a binder solution. Super P carbon and the Si negative active material coated with Co and $CO_3O_4$ were added to the binder solution, preparing a negative active material slurry. The prepared negative active material slurry was coated on copper foil, and then dried at 130° C. in a vacuum oven and compressed with a press, thereby fabricating a negative electrode.

The prepared negative electrode for a rechargeable lithium battery cell and a lithium metal counter electrode were used to fabricate a rechargeable lithium battery cell. The electrolyte solution was prepared by mixing ethylene carbonate and diethylene carbonate in a volume ratio of 1:1 and dissolving 1.3M of $LiPF_6$ therein.

Example 2

A rechargeable lithium battery was fabricated as in Example 1, except that $NH_4OH$ was added to the precursor solution to regulate the pH to 5.2.

Example 3

A rechargeable lithium battery was fabricated as in Example 1, except that $NH_4OH$ was added to the precursor solution to regulate the pH to 6.0.

Example 4

A rechargeable lithium battery was fabricated as in Example 1, except that $NH_4OH$ was added to the precursor solution to regulate the pH to 7.0.

Example 5

A rechargeable lithium battery was fabricated as in Example 1, except that nickel acetate $(Ni(CH_3COO)_2)$ was used instead of cobalt acetate $(Co(CH_3COO)_2)$.

Comparative Example 1

A rechargeable lithium battery cell was fabricated as in Example 1, except that Si powder was used as the negative active material.

Figure 4:
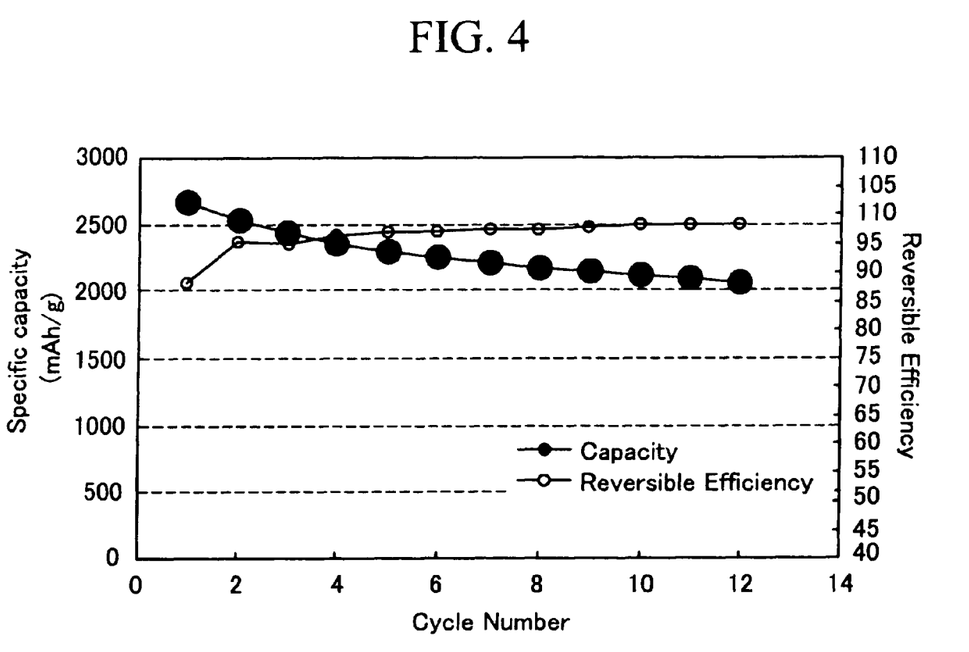
FIG. 4 is a graph of cycle-life characteristics of the rechargeable lithium battery cell prepared according to Example 1.
Figure 5:
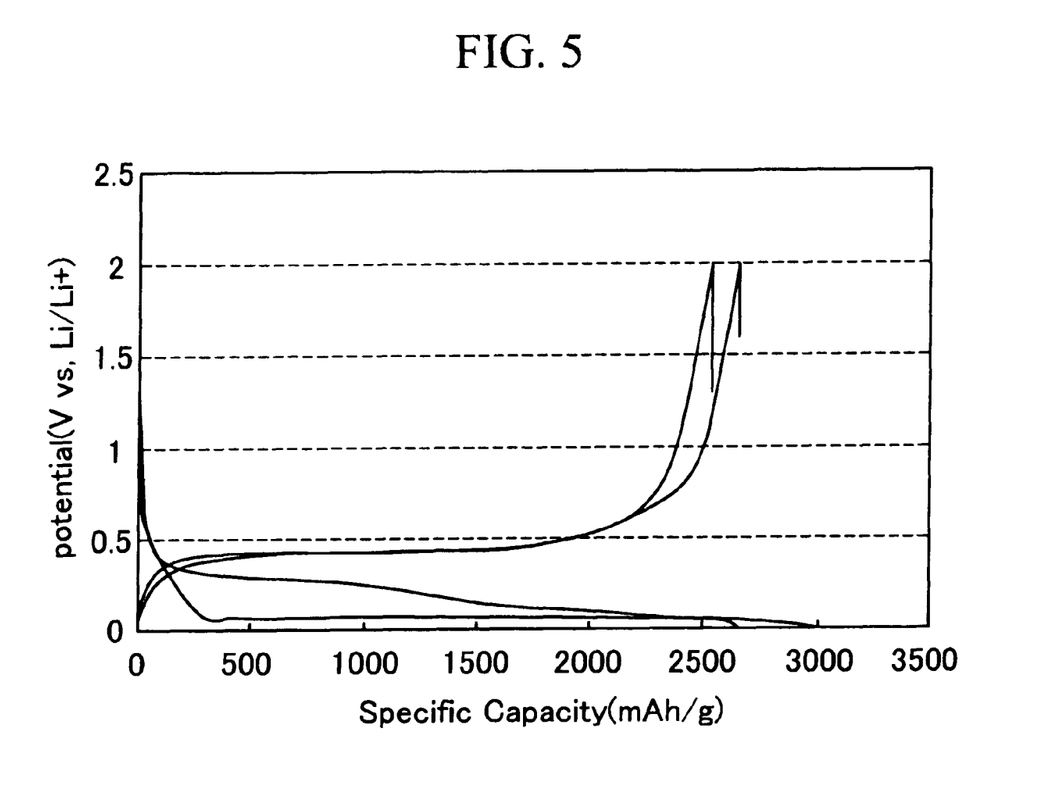
FIG. 5 is a graph of charge and discharge characteristics of the rechargeable lithium battery cell prepared according to Example 1.
Figure 6:
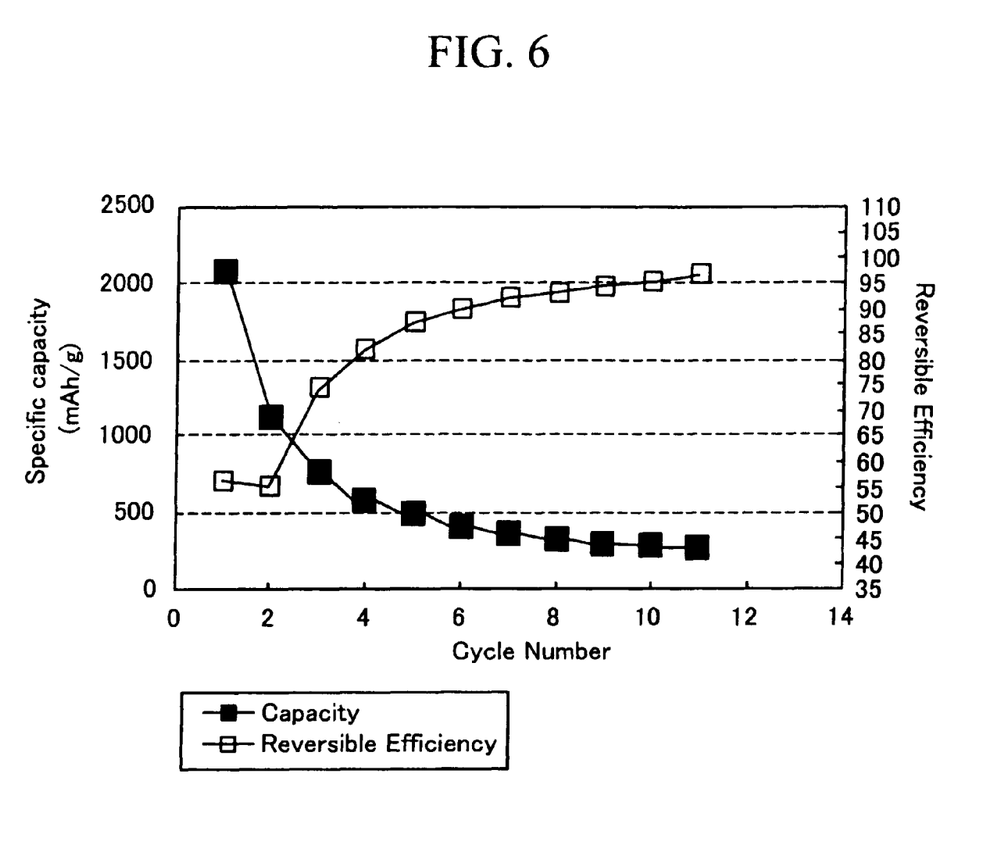
FIG. 6 is a graph of cycle-life characteristics of the rechargeable lithium battery cell prepared according to Comparative Example 1.
Figure 7:
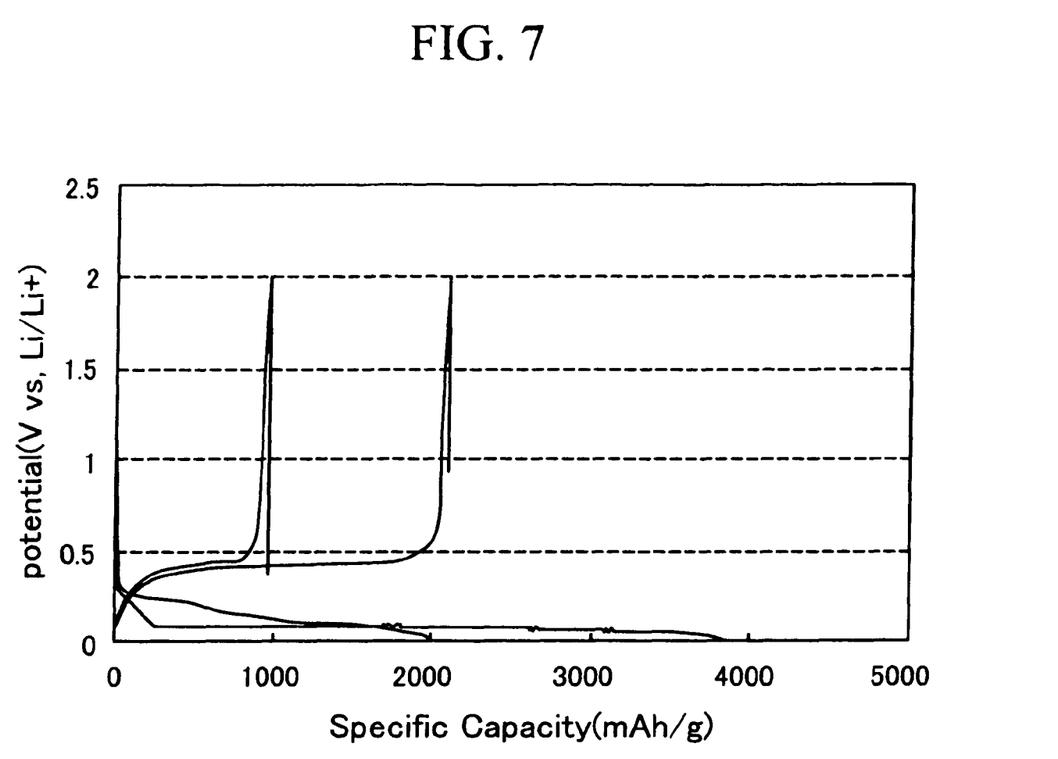
FIG. 7 is a graph of charge and discharge characteristics of the rechargeable lithium battery cell prepared according to Comparative Example 1.

Then, the cycle-life characteristics and charge and discharge characteristics of the battery cells fabricated according to Example 1 and Comparative Example 1 were measured. The results are provided in FIGS. 4 through 7. FIG. 4 is a graph of the cycle-life characteristics of the battery cell fabricated according to Example 1, and FIG. 5 is a graph of the charge and discharge curves of the battery cell of Example 1. FIG. 6 is a graph of the cycle-life characteristics of the battery cell fabricated according to Comparative Example 1, and FIG. 7 is a graph of the charge and discharge curves of the battery cell fabricated according to Comparative Example 1.

The results show that the battery cell including Si powder coated with Co and $CO_3O_4$ as the negative active material (Example 1) have better cycle-life characteristics and initial efficiency than the cell including only Si powder as the negative active material (Comparative Example 1).

Figure 8:
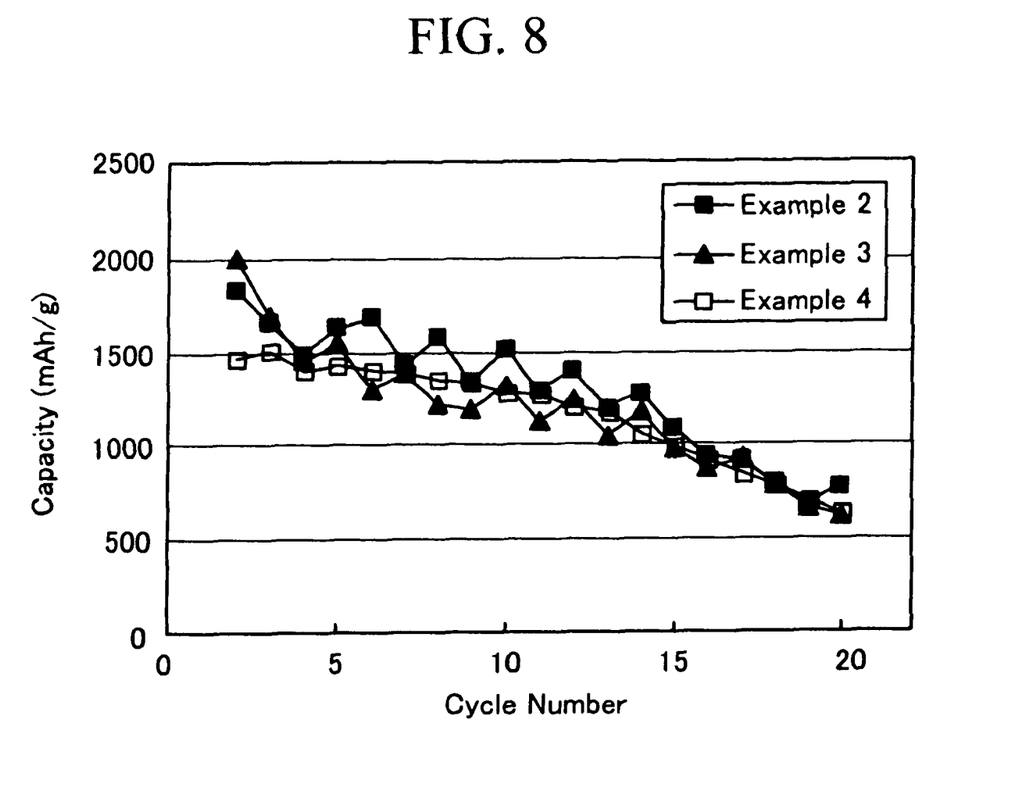
FIG. 8 is a graph of cycle-life characteristics of the rechargeable lithium battery cells prepared according to Examples 2 through 4.

FIG. 8 is a graph of the cycle-life characteristics of the rechargeable lithium battery cells prepared according to Examples 2 through 4 of the present invention. As shown in FIG. 8, the cells including precursor solutions having a pH ranging from 5.2 to 7.0 have improved cycle-life characteristics.

Therefore, the inventive negative active materials do not have many of the problems with conventional negative active materials, such as pulverization, bad contact with the conductive material, detachment from the current collector, and the like which typically occur due to volume expansion. Accordingly, the inventive negative active materials impart improved cycle-life characteristics to rechargeable lithium batteries and improved electric conductivity to negative electrodes, thereby enhancing the initial efficiency of rechargeable lithium batteries.

While certain exemplary embodiments of the invention have been described, it is understood by those of ordinary skill in the art that various modifications and alterations to the described embodiments may be made without departing from the spirit and scope of the invention, as described in the appended claims.

What is claimed is:

1. A negative active material for a rechargeable lithium battery comprising:
    an active metal core comprising active metal particles, wherein the active metal core comprises an active metal selected from the group consisting of Si, Sn, and combinations thereof; and
    a crack inhibiting layer comprising manganese oxide, the crack inhibiting layer completely surrounding the active metal particles.

2. The negative active material of claim 1, wherein the active metal particles have an average particle diameter of about 50 μm or less.

3. The negative active material of claim 2, wherein the active metal particles have an average particle diameter ranging from about 1 to about 10 μm.

4. The negative active material of claim 1, wherein a ratio of a thickness of the crack inhibiting layer to an average particle diameter of the active metal particles ranges from about 0.01 to about 1.

5. The negative active material of claim 4, wherein the ratio of the thickness of the crack inhibiting layer to the average particle diameter of the active metal particles ranges from about 0.01 to about 0.5.

6. The negative active material of claim 1, wherein the crack inhibiting layer further comprises an elemental metal.

7. The negative active material of claim 6, wherein the elemental metal comprises a transition metal.

8. The negative active material of claim 7, wherein the transition metal is selected from the group consisting of Co, Ni, Mn, Cu, V, Al, Ti, and combinations thereof.

9. The negative active material of claim 1, wherein the crack inhibiting layer has an ion conductivity of about 0.012 1/mohm·cm or greater.

10. A rechargeable lithium battery comprising:
    a negative electrode comprising a negative active material comprising:
        an active metal core comprising active metal particles, wherein the active metal core comprises an active metal selected from the group consisting of Si, Sn, and combinations thereof, and
        a crack inhibiting layer comprising manganese oxide, the crack inhibiting layer completely surrounding the active metal particles;
    a positive electrode comprising a positive active material capable of reversibly intercalating and deintercalating lithium; and
    an electrolyte.

11. The rechargeable lithium battery of claim 10, wherein after charging of the rechargeable lithium battery, the crack inhibiting layer further comprises lithium oxide ($Li_2O$) and an elemental metal.

* * * * *